US008169757B2

(12) United States Patent
Larson et al.

(10) Patent No.: US 8,169,757 B2
(45) Date of Patent: May 1, 2012

(54) CIRCUIT BREAKER WITH BISTABLE DISPLAY

(75) Inventors: Brett Larson, Cedar Rapids, IA (US); Gary Scott, Mt. Vernon, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 529 days.

(21) Appl. No.: 12/337,515

(22) Filed: Dec. 17, 2008

(65) Prior Publication Data

US 2010/0149711 A1 Jun. 17, 2010

(51) Int. Cl.
*H02H 3/00* (2006.01)

(52) U.S. Cl. .......................................................... 361/42

(58) Field of Classification Search ..................... 361/42
See application file for complete search history.

(56) References Cited

U.S. PATENT DOCUMENTS 5,408,187 A * 4/1995 Mackie ......................... 324/555
5,475,371 A * 12/1995 Dunk et al. ................... 340/660
6,049,143 A * 4/2000 Simpson et al. .............. 307/126
6,552,884 B2 * 4/2003 Kim et al. ....................... 361/42
7,330,174 B2 * 2/2008 du Breuil ...................... 345/107
2007/0188955 A1 * 8/2007 Elms ............................... 361/84
2007/0247768 A1 * 10/2007 Meehleder et al. ............. 361/42
2009/0140871 A1 * 6/2009 Titus ............................. 340/638

FOREIGN PATENT DOCUMENTS

DE 102007058751 A1 * 4/2009

* cited by examiner

*Primary Examiner* — Jared Fureman
*Assistant Examiner* — Scott Bauer

(57) ABSTRACT

A circuit breaker is disclosed that has a bi-stable display that maintains an indication of a fault condition after power is interrupted to the circuit breaker. The circuit breaker has a microcontroller that receives power derived from a line current that passes through the circuit breaker or the line voltage when the circuit breaker is in an on state. The bi-stable display is electrically coupled to and controlled by the microcontroller. A tripping mechanism trips the circuit breaker in response to detection of a fault condition. The tripping mechanism trips the circuit breaker in response to receiving a trip signal from the microcontroller. The microcontroller is programmed to modify the bi-stable display when sending the trip signal to the electronic switching device. The bi-stable display shows an indication of one of the several fault types that would have caused the circuit breaker to trip. The bi-stable display continues to display the fault-type indication after the circuit breaker has tripped and power is interrupted to the microcontroller.

20 Claims, 5 Drawing Sheets

CIRCUIT BREAKER WITH BISTABLE DISPLAY

FIELD OF THE INVENTION

Aspects disclosed herein relate generally to circuit breakers, and, more particularly, to a circuit breaker having a bistable display showing a fault condition after power is cutoff to the circuit breaker.

BACKGROUND

Circuit breakers provide automatic current interruption to a monitored circuit when undesired fault conditions occur. These fault conditions include, for example, arc faults, overloads, ground faults, and short-circuits. As is well-known, a circuit breaker is an automatically operated electromechanical device designed to protect branch wiring from damage caused by an overload or a short circuit. A typical circuit breaker has a load connector and a power connector with a break mechanism interposed between the load connector is (connected to a load device) and the power connector (connected to a power source such as a panel board). Various fault conditions trip the circuit breaker thereby interrupting power flow between the load and the power source. A circuit breaker can be reset (either manually or automatically) to resume current flow to the load.

An overcurrent may be detected when the fault current generates sufficient heat in a strip composed of a resistive element or bimetal to cause the bimetal to deflect and/or bend. The mechanical deflection triggers a trip assembly that includes a spring-biased trip lever to force a moveable contact attached to a moveable conductive blade away from a stationary contact, thereby breaking the circuit. When the circuit is exposed to a current above that level for a predetermined period of time, the trip assembly activates and tripping occurs thereby opening the circuit.

A circuit breaker may also include a solenoid coupled to electronic components that detect one or more fault conditions such as an arc fault in branch wiring or cord sets and are operable to cause the circuit breaker to electronically trip. The solenoid and the electronic components may be provided in addition to or in lieu of the thermal-magnetic tripping components. The electronic components process a signal output of a sensor that monitors current flowing in the circuit breaker. The electronic components may be configured to determine whether one of the fault conditions is present and to generate a fault signal and/or a trip signal. In response to the generation of a fault signal, a magnetic field is created around the solenoid, causing a plunger to move an armature relative to a yoke, which triggers a chain of mechanical actions that cause the circuit breaker to electronically trip.

The data on what fault conditions were present to trigger the trip condition is useful for fault diagnosis. Thus, a circuit breaker ideally includes an indication of the condition that leads to the tripping of the circuit breaker. However in many current mechanical or electrical circuit breaker designs, the event that led to the trip condition is not indicated by the circuit breaker. Thus, fault diagnosis is complicated by the lack of information to assist a technician.

One proposed solution uses light emitting diodes (LEDs) to indicate the cause of the trip condition. However, this solution requires the power to be enabled to the electronics of the circuit breaker in order to power the LEDs to display the causes of a trip condition. However, this requires power to be restored to power the LED fault display. Such restored power is also supplied to the load side terminals creating a potential hazard since the cause of the fault may still be connected to the load side terminals. Further, the fault condition must be stored in the memory of the circuit breaker thus taking up memory space.

The current circuit breaker designs therefore suffer from a problem of not having any indication of the fault that caused a tripped state when the power is turned off.

BRIEF SUMMARY

One disclosed example is a circuit breaker that includes a bi-stable display. A bi-stable display is a display that maintains an image without power. In this example, the bi-stable display maintains an indicator of a fault that caused the circuit breaker to trip regardless of whether power is maintained to the bi-stable display. In this manner, an electrician or homeowner may quickly tell the cause of the trip condition that caused the circuit breaker to interrupt power flow. This may aid in the diagnosis and solution of the problem that caused the power flow interruption.

An example circuit breaker has a load connector that is connected to a load that is sought to be protected and a power connector that is connected to a power line. The circuit breaker has a trip mechanism that when triggered interrupts current flow between the power line and the load. The trip mechanism typically includes an external handle and an actuating arm. If the trip mechanism is in an on condition (e.g., handle in an up position), current flows to the load. In order to protect the load, the circuit breaker can detect various faults such as ground fault or an arc fault on the load. On detecting a fault, a trip condition, interrupting current to the load, is triggered to protect the load. In this case, the handle is moved to a trip condition (e.g., handle is in a down position). The bi-stable display indicates the type of fault condition when the trip condition is triggered. When the trip condition is triggered, power is cutoff to the circuit breaker for safety reasons. However, the bi-stable display continues to indicate the fault condition thus showing an electrician or homeowner the cause of the trip condition without having to power up the circuit breaker.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1A:
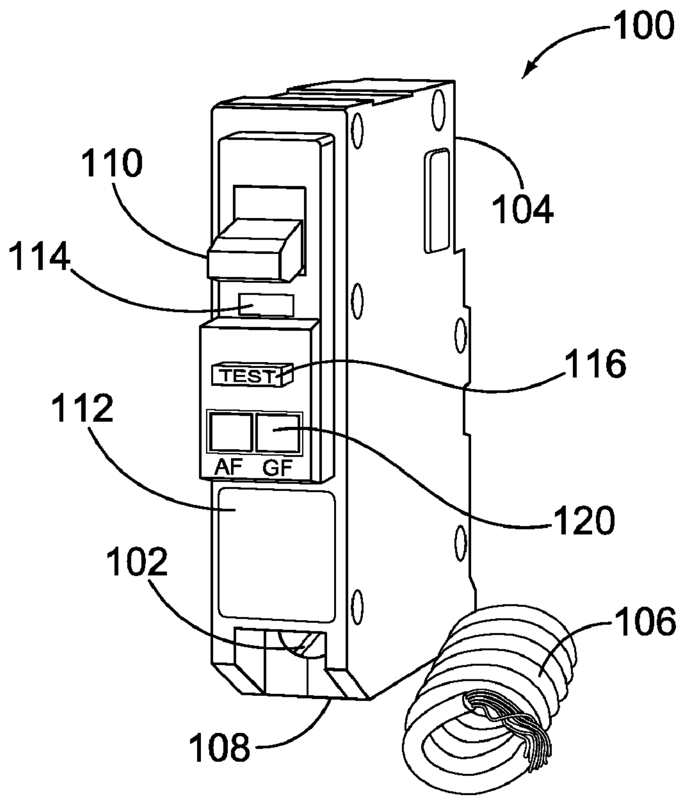
FIG. 1A is a perspective view of a circuit breaker with a bi-stable display that maintains a fault indication after power is interrupted to the circuit breaker.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Turning now to FIG. 1A, a perspective view of a circuit breaker 100 is shown. The circuit breaker 100 includes a load side connector 102, a power line connector 104, a line neutral source wire 106 and a load neutral connector 108. A handle 110 connected to a trip mechanism (detailed below) is mounted on a front panel 112. The handle 110 may be placed in an on position (up position not shown in FIG. 1A) that causes the circuit breaker 100 to allow current flow between the power line connector 104 and the load side connector 102. The handle 110 may be placed in a tripped condition (down position shown in FIG. 1A) cutting off current flow between the power side connector 104 and the load side connector 102. A lens 114 is mounted below the handle 110 and shows an indication that the handle 110 is in a trip condition. A test button 116 is provided to test the internal electronics of the circuit breaker 100. A bi-stable display 120 is also mounted on the front panel 112. In this example, the circuit breaker 100 may be a miniature circuit breaker, such as the QO® and HOMELINE® family of circuit breakers available from Square D Company. However, it is to be understood that the principles discussed herein may be applied to other types of circuit breakers.

Figure 1B:
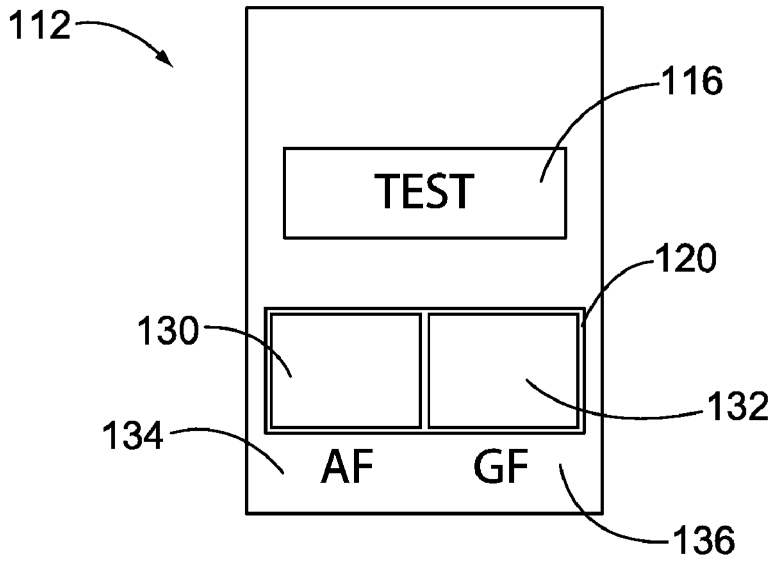
FIG. 1B is a close-up view of the bi-stable display on the circuit breaker in FIG. 1A.

The example circuit breaker 100 shown in FIG. 1A allows the cause of the tripping event for the circuit breaker 100 to be displayed on the bi-stable display 120 without power to the electronics of the circuit breaker 100. The bi-stable display 120 thus provides a fault-type indication indicative of which one of a plurality of fault types caused the circuit breaker 100 to trip and continues to display the fault-type indication after the circuit breaker 100 has tripped. As shown in FIG. 1B, the bi-stable display 120 in this example has an AF area 130 and a GF area 132. Printed indicia such as an "AF" graphic 134 and a "GF" graphic are located below each of the areas 130 and 132 respectively. In cases of a detected arc fault, the AF area 130 will be darkened indicating that an arc fault triggered the trip condition of the circuit breaker 100. A darkened AF area 130 over the "AF" graphic 134 indicates an arc fault to a user. In cases of a detected ground fault, the GF area 132 will be darkened indicating that a ground fault s triggered the trip condition of the circuit breaker 100. Neither the AF area 130 nor the GF area 132 will be darkened if the circuit breaker 100 is triggered by an event other than an arc fault or a ground fault. A darkened GF area 132 over the "GF" graphic 136 indicates an arc fault. The bi-stable display 120 does not consume power to maintain the display of the cause of a tripping event as either the GF or AF areas 130 and 132 remain darkened even after power is cutoff to the bi-stable display 120.

Figure 2:
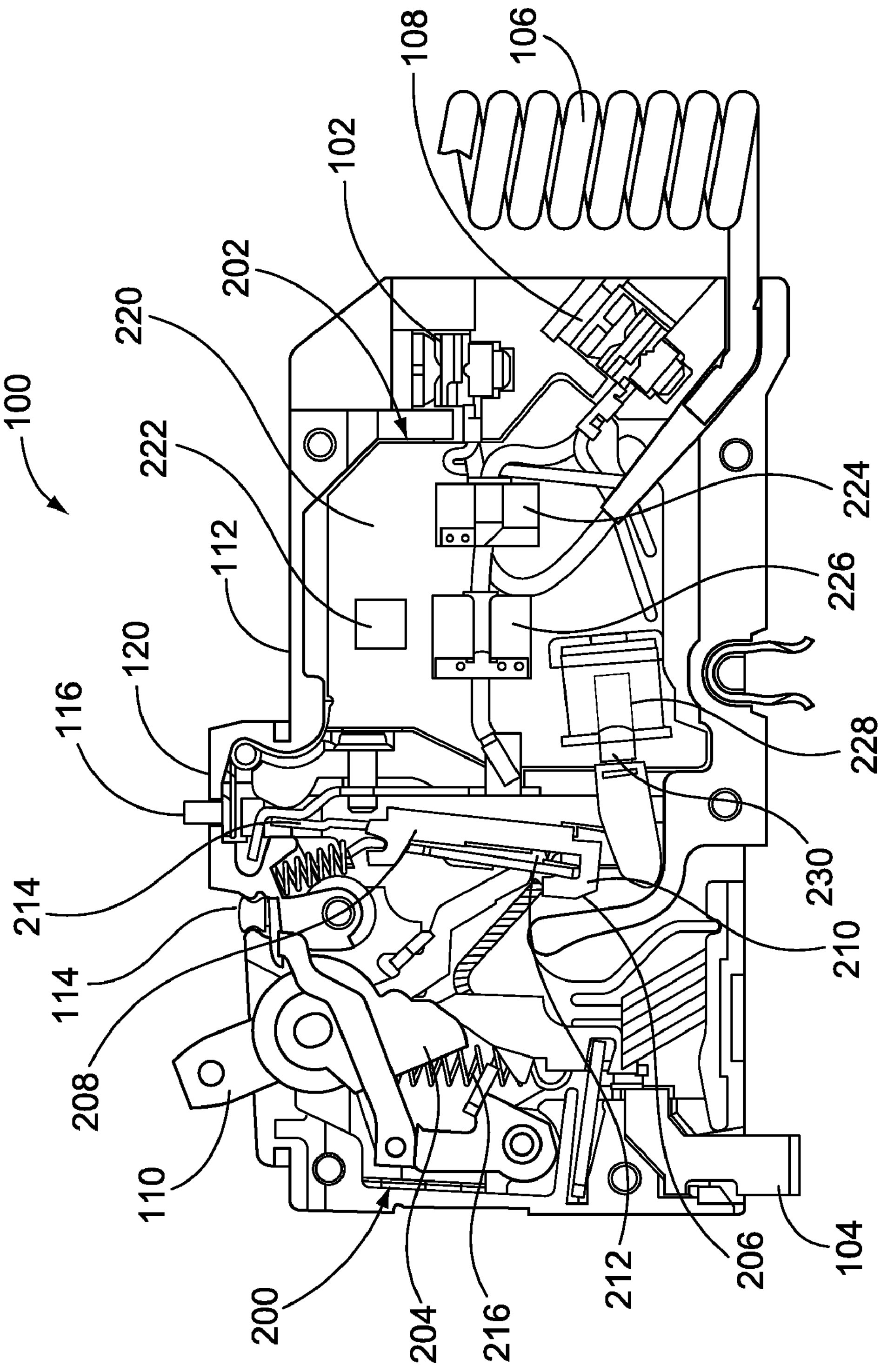
FIG. 2 is a cross section view of the internal components of the circuit breaker in FIG. 1A.

FIG. 2 is cross section view of the internal components of the circuit breaker 100 in FIG. 1A. Like elements from FIG. 1A have like element numbers in FIG. 2. The circuit breaker 100 contains a trip mechanism 200 and an electronics module 202. The trip mechanism 200 includes a trip lever 204 connected to the handle 110. The trip lever 204 is engaged with a is latch seat 206 of an armature 208. The armature 208 is in a calibrated position such that a free end 210 of the armature 208 contacts a yoke hook 212. The yoke hook 212 may be triggered by a bi-metal strip 214 that bends when a heat threshold is exceeded by current flowing through the b-metal strip 214, thus causing the armature 208 to be released from the yoke hook 212 causing a spring 216 to drive the trip lever 204 and handle 110 to the trip position (shown in FIG. 1). The movement of the trip lever 204 to the trip position breaks the electrical path between the line power connector 104 and the load power connector 102.

The electronics module 202 includes a circuit board 220 that mounts a microprocessor 222, a ground fault sensor 224, a current sensor 226, and a trip solenoid 228. It is to be understood that the functions of the microprocessor 222 may be performed by a processor, microcontroller, controller, and/or one or more other suitable processing device(s) such as an application specific integrated circuit (ASIC), a programmable logic device (PLD), a field programmable logic device (FPLD), a field programmable gate array (FPGA), discrete logic, etc.

Figure 3:
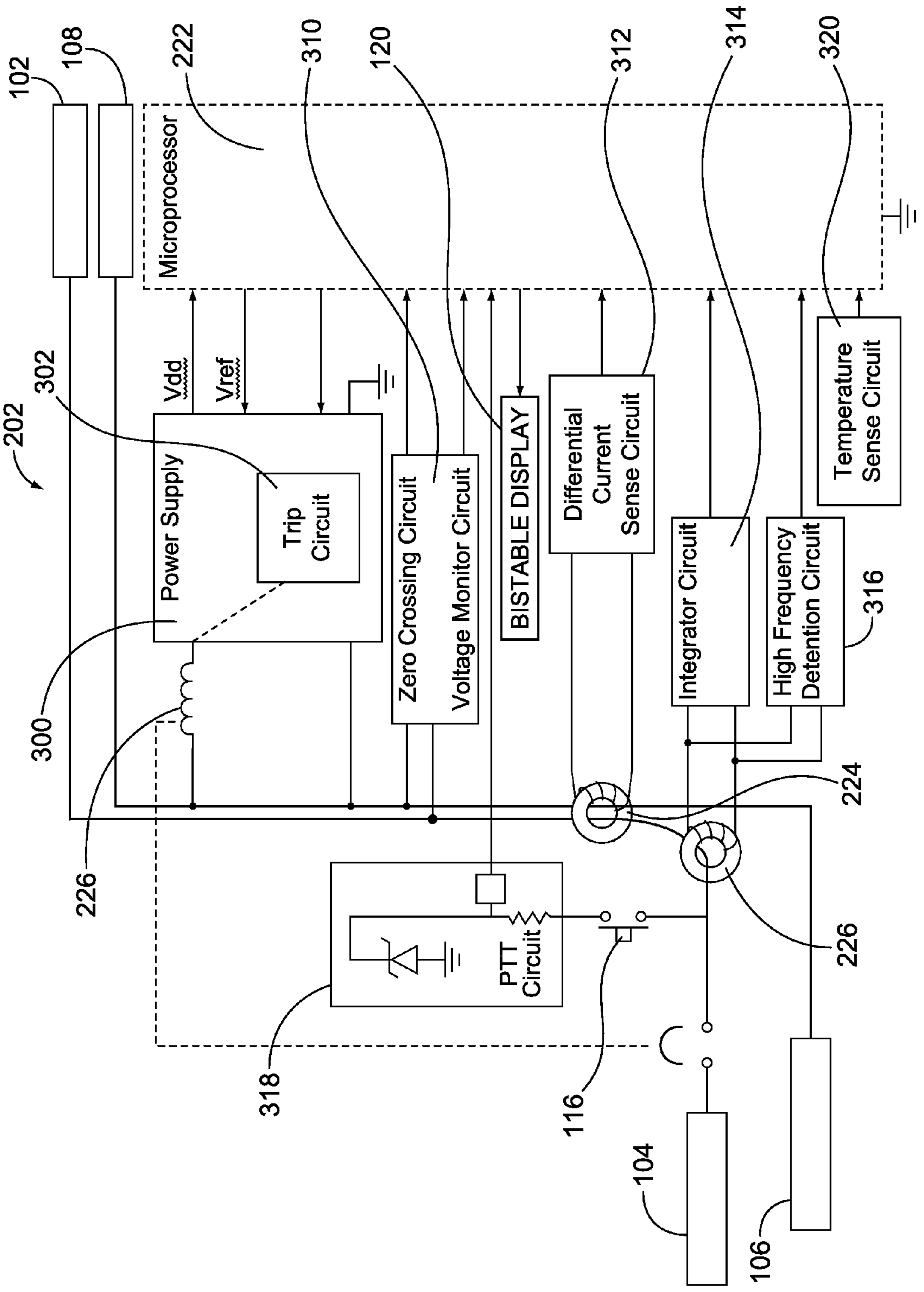
FIG. 3 is a block diagram of the electronic components of the circuit breaker in FIG. 1A.

FIG. 3 is a block diagram of the electronic components of the electronics module 202 with like elements from FIG. 2 having like element numbers. The electronics module 202 includes a power supply 300 that provides power for the electronic components in the circuit breaker 100. The power supply 300 provides a regulated power supply and a reference voltage input to the microprocessor 222. The microprocessor 222 may electronically cause the circuit breaker 100 to trip based on signals sensed by the ground fault sensor 224 or the current sensor 226 from the current flowing between the load connector 102 and the line connector 104. On detection of a fault condition, the microprocessor 222 sends a signal to a trip circuit 302 that causes the trip solenoid 228 to activate a plunger 230 thus causing the armature 208 to release the yoke hook 212 causing the spring 216 to drive the trip lever 204 and handle 110 to the trip position thus breaking the electrical path between the line connector 104 and the load connector 102. The microprocessor 222 analyzes the signals from the sensors 224 and 226 for indicators of fault conditions that may include, but are not limited to ground faults, arcing faults, overloads, and short-circuits.

The microprocessor 222 monitors the inputs from several input circuits including a zero crossing circuit and voltage monitoring circuit 310, a differential current sensor circuit 312, an integrator circuit 314, a high frequency detection circuit 316, a push to test circuit 318, and a temperature sensor circuit 320. In this example, the differential current sensor circuit 312 is coupled to the ground fault sensor 224. The integrator circuit 314 and the high frequency detection circuit 316 are coupled to the current sensor 226. The ground fault sensor 224 and differential current sensor circuit 312 provide an input to the microprocessor 222 indicating the presence of a ground fault or arcing ground fault from the load connector 102. The current sensor 226 and the integrator circuit 314 provide an input to the microprocessor 222 indicating the presence of an arc fault on the load connector 102.

The microprocessor 222 operates the bi-stable display 120 by sending signals to the bi-stable display 120 to change the display state to indicate the type of fault condition without delaying the tripping of the trip mechanism 200 by either the bi-metal strip 214 or the solenoid 228. In this manner, the internal load side conductors coupled to the load connector 102 are brought to an electrically safe condition immediately. When power is removed from the electronic module 202 by the tripping process, the bi-stable display 120 maintains display of the fault that caused the trip condition. Electrical energy from the electronic module 202 may be used to change the state of the bi- stable display 120 once the handle 110 of the circuit breaker 100 is reset to the on position.

Figure 4A:
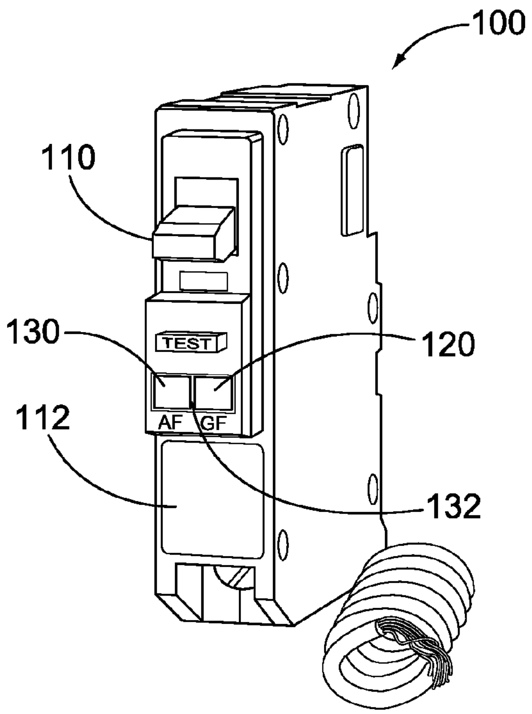
FIGS. 4A-4C are perspective views of the circuit breaker in FIG. 1A showing the various indications on the bi-stable display relating to different fault conditions tripping the circuit breaker in FIG. 1A.
Figure 4B:
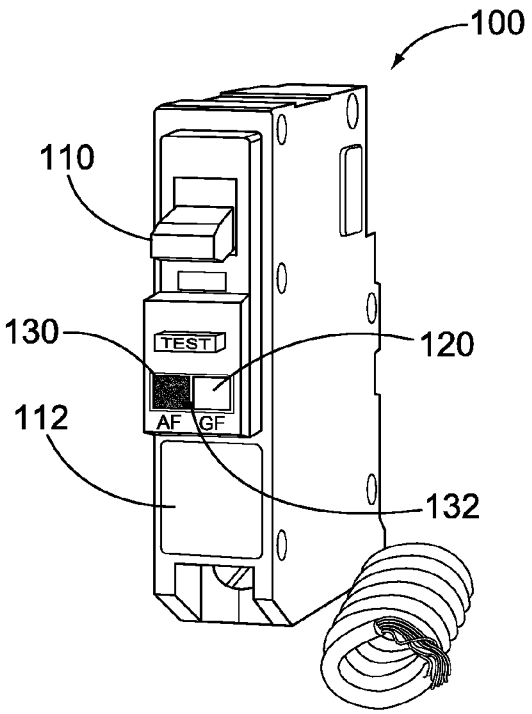
Figure 4C:
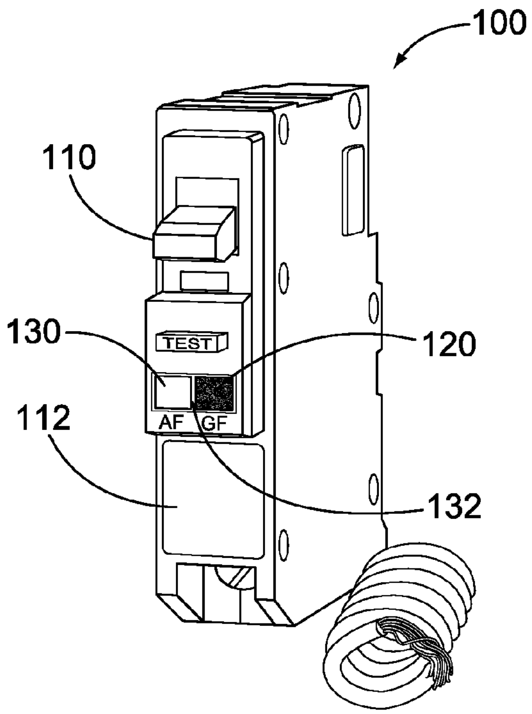

As shown in FIGS. 4A-4C, the bi-stable display 120 may be used to inform a user as to the fault condition that existed on the load that caused the trip condition. Such information regarding the cause of the trip condition may be used for fault analysis. In the case of a normal circuit or overload condition, the thermal or magnetic systems of the circuit breaker 100 trips the trip mechanism. The handle position of the handle 110 and the bi-stable display 120 after a trip that does not involve an arc fault or a ground fault is shown by the circuit breaker 100 in FIG. 4A. Neither the AF area 130 nor the GF area 132 is darkened, indicating that neither an arc fault nor a ground fault caused the trip condition. However, if there are certain specific conditions on the load connector 102 that caused the circuit breaker 100 to trip, the state of the bi-stable display 120 is changed by the electronics module 202 while simultaneously sending a trip signal to the trip solenoid 228. The resulting state of the bi-stable display 120 indicates the type of fault that triggered the circuit breaker 100. In FIG. 4B, the bi-stable display 120 has darkened the "AF" area 130, which is indicative of an arc fault. In FIG. 4C, the bi-stable display 120 has darkened the "GF" area 132, indicative of arc fault. In either case, the bi-stable display 120 maintains the indication of the trip state indefinitely until power is restored to the circuit breaker 100 and the bi-stable display 120 is reset via a reset or clear signal from the microprocessor 222. In this example, the "AF" graphic 134 and the "GF" graphic 136 are printed below the bi-stable display 120, but the graphics may be printed anywhere in proximity to the bi-stable display 120 in this example. It is to be understood that graphic indicators similar to the AF and GF graphics 134 and 136 may be displayed directly on the bi-stable display 120.

Figure 5A:
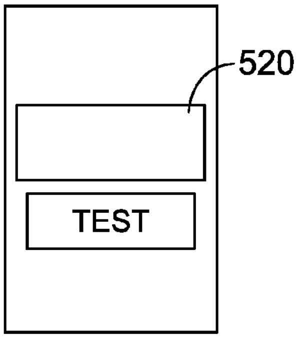
FIGS. 5A-5C are views of an alternative bi-stable display that may be used with the circuit breaker in FIG. 1A.
Figure 5B:
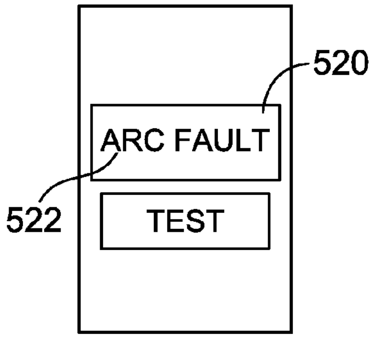
Figure 5C:
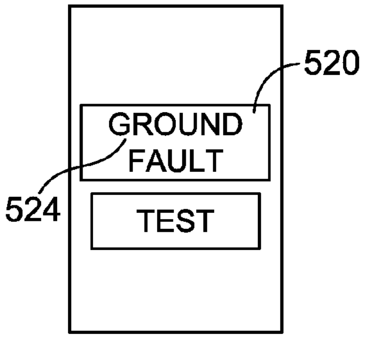

FIGS. 5A-5C show an alternate bi-stable display 520 that may display different text in a bi-stable state. FIG. 5A shows the bi-stable display 520 after a trip condition that was not caused by an arc fault or a ground fault. The bi-stable display 520 does not have any indicative text in FIG. 5A, thus indicating that the trip condition has a cause other than an arc fault or a ground fault. FIG. 5B shows the bi-stable display 520 with a graphic indicator 522 that indicates an arc fault triggered the trip condition. FIG. 5C shows the bi-stable display 520 with a graphic indicator 524 that indicates a ground fault triggered the trip condition. As with the display 120 in FIGS. 4A-4C, the graphic indicators 522 or 524 remain on the bi-stable display 520 after power is cutoff to the circuit breaker.

Alternatively, one of ordinary skill may modify the bi-stable display 120 to allow the display of additional information relating to the state of the circuit breaker 100 such as the level of ground fault (e.g., in mA) or the level of high frequency of the low current by segmenting the bi-stable display 120 and providing additional output signals to activate different parts of the display to show additional characters or text similar to the alternative bi-stable display 520 shown in FIGS. 5A-C.

It is also to be understood that the bi-stable display 120 may be used during the on state of the circuit breaker 100 to indicate various operating parameters of the circuit breaker 100 or a monitored circuit coupled to the circuit breaker 100. Such operating parameters may include the level of current flowing through the circuit breaker, level of high frequency, voltage, power factor, power, etc. The indication of the operating parameters may be text, bar graph, pulsating indicator (rate of pulse increase with current level, ground fault level, etc.), etc. The operating parameters displayed on the bi-stable display 120 may be transmitted by the microprocessor 222 along with suitable output signals for controlling the display 120.

Figure 6:
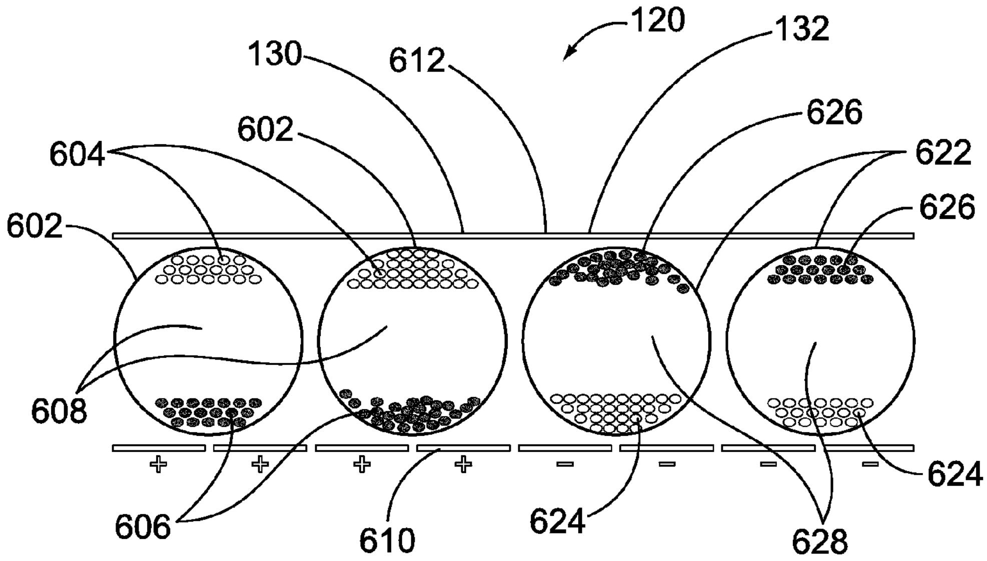
FIG. 6 is a cross-section of an example bi-stable display of the circuit breaker of FIG. 1A.

In the example shown in FIG. 1A, the bi-stable display 120 is a bi-stable display device based on electrostatic charges used to affect "electronic ink" suspended in the display plane. FIG. 6 shows a cross-section view of the bi-stable display 120 in FIGS. 1A and 1B. The AF area 130 of the bi-stable display 120 includes an array of spheres 602 that each include a plurality of white subcapsules 604 and a plurality of black subcapsules 606 suspended in a clear fluid 608. The bi-stable display 120 includes an array of back electrodes 610 and a corresponding array of transparent front electrodes 612. Correspondingly, the AF area 132 of the bi-stable display 120 includes an array of spheres 622 that each include a plurality of white subcapsules 624 and a plurality of black subcapsules 626 suspended in a clear fluid 628. The spheres 602 and 622 are electro-statically charged with the black subcapsules 606 and 626 carrying the negative charge and the white subcapsules 604 and 624 carrying a positive charge. In the example bi-stable display 120, the array of electrodes 610 and 612 allows the color of each specific sphere such as the spheres 602 or 622 to be changed by changing the locations of the black and white subcapsules. Since the front electrodes 612 are transparent, the color of the different areas of the bi-stable display 120 may be seen by a user.

When a charge is placed across the electrodes 610 and 612 in a particular area defined by a sphere or spheres 602 or 622, the subcapsules 604 or 624 and 606 or 626 move to align with the front to back charge gradient in that area. The subcapsules 604 or 624 and 606 or 626 are suspended in the clear fluid 608 or 628. The clear fluid 608 and 628 is viscous and the subcapsules 604 or 624 and 606 or 626 remain in the position dictated by the charge between the electrodes 610 and 612 after the charge is removed from the electrodes 610 and 612. For example, this makes the surface appear white at that area in the case of the AF area 130 in FIG. 6. At the same time, an opposite electric field pulls the black subcapsules 606 to the bottom of the spheres 602 where they are hidden. By reversing this process, the black subcapsules such as the black subcapsules 626 appear at the top of the spheres such as shown in the spheres 622, which now makes the surface of the bi-stable display 120 appear dark at that spot. Therefore the bi-stable display 120 continues to show the color shown in the area when the power is cutoff.

The electronic module 202 in FIG. 2 therefore will send an activation signal to the electrodes in the GF area 132 of the bi-stable display 120 simultaneously with energizing the trip solenoid 228 in the case of a detected ground fault. After power is shut off to the circuit breaker 100, the black subcapsules 626 in the spheres 622 in the GF area 132 of the bi-stable display 120 as shown in FIG. 6 will remain suspended near the transparent electrode 612 therefore providing an indicator of the ground fault independent of maintaining power to the circuit breaker 100. Conversely, if an arc fault is detected by the electronic module 202 in FIG. 2, an activation signal will be sent to the electrodes of the AF area 130 of the bi-stable display 120 simultaneously with energizing the trip solenoid 228. After power is shut off to the circuit breaker 100, the black subcapsules 606 in the spheres 602 in the AF area 130 of the bi-stable display 120 will remain suspended near the transparent electrode 612 thereby providing an indicator of the arc fault independent of maintaining power to the circuit breaker 100. The ability of the bi-stable display 120 to retain the indication of the fault does not require non-volatile memory, which if present may be allocated for other purposes.

There may be other types of bi-stable displays that may be used for the bi-stable display 120 in FIG. 1. For example, modified liquid crystal technology may be used for bi-stable displays. Such displays may include a cholesteric LCD technology that reflects almost all of the image light cast on it while attenuating most of the ambient light to produce a bright reflected display. For example, thin and flexible electronic paper may be used for the bi-stable display 120. The electronic paper may use a liquid crystal dispersed in a polymer or a microcup structure to hold electronic ink stable on the paper. Another alternative is a nano-structure semi-conducting metal oxide film having a layer of viologen molecules creating black and white high contrast images. Another alternative is a micro-structured grating surface that controls liquid crystal alignment.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. An electronic circuit breaker, comprising:

a microcontroller that receives power derived from a line current that passes through the circuit breaker when the circuit breaker is in an on state;

a trip mechanism that trips the circuit breaker in response to detection of at least one fault condition on a line to which the circuit breaker is connected;

a trip solenoid that causes the trip mechanism to trip the circuit breaker in response to receiving a trip signal from the microcontroller; and a bi-stable display electrically coupled to the microcontroller, the microcontroller being programmed to modify the bi-stable display when the trip signal is sent to the trip solenoid, and power is immediately cutoff to the bi-stable display after the circuit breaker is tripped, wherein the bi-stable display shows a fault-type indication indicative of one of a plurality of fault types causing the circuit breaker to trip and continues to display the fault-type indication after the circuit breaker has tripped and power is cutoff to the display.

2. The circuit breaker of claim 1, further comprising printed indicia in proximity to the bi-stable display indicating a plurality of fault types.

3. The circuit breaker of claim 1, wherein the bi-stable display includes a text indicator of the plurality of fault types.

4. The circuit breaker of claim 1, wherein the fault types include a ground fault and an arc fault.

5. The circuit breaker of claim 1, wherein the bi-stable display includes a plurality of spheres each including black and white subcapsules in a clear fluid and a front and back electrode, wherein charging the electrodes causes the black and white subcapsules to align with the front to back charge gradient generated by the electrodes.

6. The circuit breaker of claim 1, wherein the bi-stable display is one of the group of a cholesteric LCD, a flexible electronic paper having a liquid crystal dispersed in a polymer or a microcup structure, a nano-structure semi-conducting metal oxide film having a layer of viologen molecules creating black and white high contrast images and a micro-structured grating surface that controls liquid crystal alignment.

7. The circuit breaker of claim 1, wherein the bi-stable display indicates an operating parameter of the circuit breaker when the circuit breaker is in the on state.

8. A circuit breaker, comprising:

a load connector;

a power connector;

a trip mechanism having an on condition allowing current between the load connector and the power connector and a trip condition interrupting current between the load connector and the power connector, the trip condition triggered in response to detection of a fault condition on a line to which the circuit breaker is connected;

a controller coupled to the trip mechanism;

a bi-stable display coupled to the controller, the controller sending a signal to the bi-stable display to indicate the fault condition when the trip condition is detected, and power is cutoff to the bi-stable display immediately after the trip condition is triggered, the bi-stable display continuing to indicate the fault condition after the circuit breaker has tripped immediately cutting off power to the bi-stable display and the signal has terminated.

9. The circuit breaker of claim 8, further comprising printed indicia in proximity to the bi-stable display indicating a plurality of fault conditions.

10. The circuit breaker of claim 8, wherein the bi-stable display includes a text indicator of the fault condition.

11. The circuit breaker of claim 8, wherein the fault condition includes a ground fault or an arc fault.

12. The circuit breaker of claim 8, wherein the bi-stable display includes a plurality of spheres each including black and white subcapsules in a clear fluid and a front and back electrode, wherein charging the electrodes causes the black and white subcapsules to align with the front to back charge gradient generated by the electrodes.

13. The circuit breaker of claim 8, wherein the bi-stable display is one of the group of a cholesteric LCD, a flexible electronic paper having a liquid crystal dispersed in a polymer or a microcup structure, a nano-structure semi-conducting metal oxide film having a layer of viologen molecules creating black and white high contrast images and a micro-structured grating surface that controls liquid crystal alignment.

14. A method of maintaining an indication of a fault on current flowing through a circuit breaker coupled between a power source and a load, the method comprising:

detecting a fault on the current;

identifying one of a plurality of fault types that caused the fault;

displaying an indication of the fault type on a bi-stable display;

immediately interrupting power to the bi-stable display after the fault is detected; and maintaining the indication of the fault type on the bi-stable display after power is interrupted to the bi-stable display.

15. The method of claim 14, further comprising interrupting the current between the power source and load substantially simultaneously with displaying the indication of the fault type.

16. The method of claim 14, wherein printed indicia is located in proximity to the bi-stable display indicating a plurality of fault types.

17. The method of claim 14, wherein the bi-stable display includes a text indicator of the fault type.

18. The method of claim 14, wherein the fault type is either a ground fault or an arc fault.

19. The method of claim 14, wherein the bi-stable display includes a plurality of spheres each including black and white subcapsules in a clear fluid and a front and back electrode, wherein charging the electrodes causes the black and white subcapsules to align with the front to back charge gradient generated by the electrodes.

20. The method of claim 14, wherein the bi-stable display is one of the group of a cholesteric LCD, a flexible electronic paper having a liquid crystal dispersed in a polymer or a microcup structure, a nano-structure semi-conducting metal oxide film having a layer of viologen molecules creating black and white high contrast images and a micro-structured grating surface that controls liquid crystal alignment.

* * * * *